Sept. 20, 1955 H. G. CARPENTER 2,718,599
PULSE TRANSFORMER CIRCUITS
Filed Jan. 27, 1953
FIG. 1.
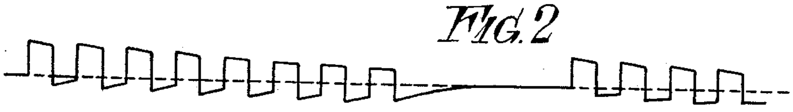
FIG. 3.
FIG. 4.
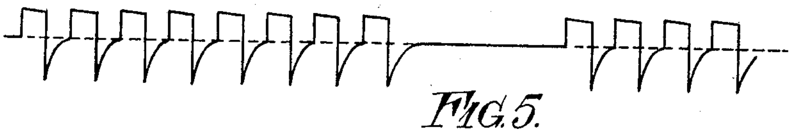
FIG. 5.
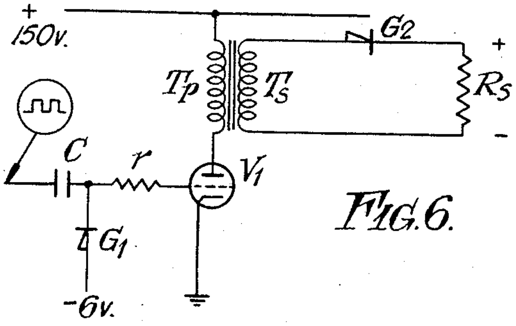
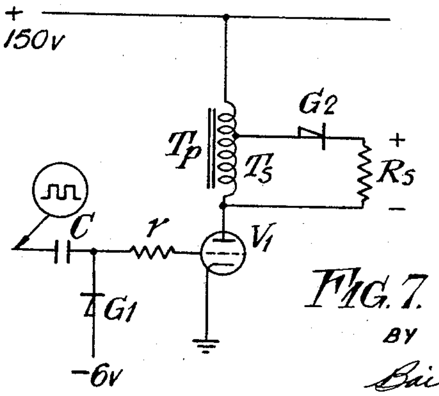
INVENTOR
HENRY GEORGE CARPENTER
BY
Bailey, Stephens & Huettig
ATTORNEYS United States Patent Office 2,718,599

Patented Sept. 20, 1955

2,718,599

PULSE TRANSFORMER CIRCUITS

Henry George Carpenter, New Milton, England, assignor to Elliott Brothers (London) Limited, London, England, a British company Application January 27, 1953, Serial No. 333,531

6 Claims. (Cl. 307—107)

This invention relates to electrical circuits embodying pulse transformers which are required to handle pulse trains, particularly, but not exclusively, pulse trains of high duty-cycle such as are utilised in electronic digital computers.

In such circuits as heretofore proposed, D. C. restoration of the output waveform has not been effective when the duty-cycle of the input pulse train has been made high. It is an object of the present invention to provide means whereby the D. C. level of the output waveform of a pulse transformer shall be made substantially independent of the duty-cycle of the input pulse train.

According to the invention, in an electrical circuit embodying a pulse transformer, a rectifying diode or other non-linear element and a resistive load are both connected in series across the output terminals of the pulse transformer, the value of the resistive load being chosen so that its reflected value at the input terminals of the transformer is low compared with the impedance of the circuit driving the transformer and the non-linear element being so connected that, on the appearance of an output pulse of correct sign at the output terminals of the transformer, the non-linear element will pass current into the resistive load. The output from the circuit is taken across the said resistance and the external load so applied may contribute to the effective value of the latter.

It is well known that the output waveform of a pulse transformer with a simple resistive load, when supplied with an input pulse train and connected, for example, to give a positive output, shows a droop on each pulse and an approximately equal negative overshoot after each pulse.

By using the circuit in accordance with the present invention, however, the negative overshoot is made large compared with the droop on the top of the pulse (say 10 times) but owing to the series-connected non-linear element this negative overshoot does not appear across the resistance, that is to say it does not appear across the load.

Owing to the fact that the negative overshoot is large compared with the droop on the top of the pulse, the condition that there shall be no mean D. C. potential across the secondary terminals is satisfied without there being any cumulative droop in the positive going pulses. The output waveform of any particular pulse is therefore substantially independent of the length and duty cycle of the pulse train immediately preceding it.

In order that the invention may be more clearly understood, two alternative forms thereof will be particularly described by way of example and with reference to the accompanying drawing, in which:

Fig. 1 shows the wave-form of a high duty-cycle pulse train to be supplied to the input of a pulse transformer circuit, Fig. 2 shows the wave-form as it appears in the output of a pulse transformer circuit of known character, prior to rectification, Fig. 3 shows the wave-form of the pulse train of Fig. 2 after rectification, Fig. 4 shows the wave-form of the pulse train produced across the output of a pulse transformer in a circuit according to this invention, Fig. 5 shows the pulse train of Fig. 4 after rectification, Fig. 6 is a circuit diagram of a pulse transformer circuit according to the present invention, and Fig. 7 shows a modification of the circuit illustrated in Fig. 6.

The high duty-cycle input pulse train shown in Fig. 1 has a mark-to-space ratio of unity, the pulses being of 0.5 $\mu$ sec. duration, 15 volts amplitude and having a pulse repetition frequency of 1 mc./s.

A transformer is essentially an A. C. coupled system and if called upon to pass a train of pulses of the character shown in Fig. 1 its output will drift according to a time-constant determined by its inductance L in henries, and the combined values of the source and load impedance $R_p$ and $R_s$, respectively.

The mean D. C. level of the output will drift negative and the output will eventually reach a D. C. level where the mean value of the voltage wave-form is zero, as illustrated in Fig. 2. On temporary cessation of the input pulse train the mean D. C. level of the output voltage drifts back to the original zero as is also shown in Fig. 2.

Referring now to the circuit according to this invention shown in Fig. 6, the input pulse train of Fig. 1 is applied to the grid of an amplifier triode valve $V_1$ by way of a condenser C of approximately 100 $\mu\mu$F. and a resistor $r$, the junction between the condenser C and the resistor $r$ being fed from a D. C. bias supply of —6 volts by way of a rectifier $G_1$. The pulse train appears at the primary $T_p$ of the transformer, the secondary winding $T_s$ of which is connected in series with a rectifier $G_2$ such as a diode or a germanium crystal and a load resistor $R_s$. The primary winding $T_p$ of the transformer is connected between the anode of the valve $V_1$ and a source of H. T. potential of the order of 150 volts. The rectifier $G_2$ ensures that only the positive part of the secondary wave-form appears across the load resistor $R_s$. If $R_s$ imposed a negligible load upon the transformer, a D. C. drift of the secondary voltage would take place and the voltage amplitude of the pulses in the output developed across $R_s$ would progressively decrease until it reached about one-half of its initial value, as shown in Fig. 3. However, this drop is avoided by choosing $R_s$ to be small compared with the primary source impedance $R_p$ and it has been found that a numerical value of the ratio of $R_p$ to $R'_s$ of the order of 10 is suitable where $R'_s$ is the load imposed on the primary winding $T_p$ by the load $R_s$, i. e. $R_s=n^2R'_s$ where $n$=ratio of number of turns of secondary winding $T_s$ to the number of turns of the primary winding $T_p$.

A pulse transformer is normally designed so that the time constant $$\frac{L}{R}\left(\text{where } R=\frac{R_pR'_s}{R_p+R'_s}\right)$$

is long compared with the pulse width, a factor of 10 being sufficient to restrict the pulse drops to a normally tolerable value. In the present case the effective value of R during the pulse time is approximately equal to $R'_s$ and the transformer is designed so that $L/R'_s$ is about ten times the pulse width.

For the duration of the pulse, therefore, while the secondary winding $T_s$ is loaded by $R_s$ through the rectifier $G_2$, the transformer has a time-constant sufficiently long to pass the pulse wave-form without serious distortion. During the space between pulses the voltage across the output terminals of the secondary winding $T_s$ swings negative (as shown in Fig. 4) and the rectifier $G_2$ ceases to conduct, disconnecting the load resistance $R_s$. This has two effects: (*a*) since the source impedance $R_p$ is high (about 10 $R'_s$) the negative overswing (Fig. 4) is about ten times the droop on the top of the pulse, and (*b*) the effective time constant of the transformer now becomes $L/R_p$ which is approximately equal to the pulse width. The voltage overswing is therefore reduced to substantially zero before the commencement of the next pulse as is clearly shown in Fig. 4.

It can be seen that the mean D. C. level of the output voltage at the terminals of the secondary winding $T_s$ is substantially zero so that this output voltage has no tendency to drift. Only the positive part of the waveform appears across the load resistance $R_s$ and the amplitude and shape of this wave-form is independent of the length of the pulse train.

Typical numerical values for the components of the circuit shown in Fig. 6 are as follows:

| | |
|---|---|
| Step-up ratio *n* of transformer | 1.8:1 |
| Primary source impedance $R_p$ | 7,000 ohms. |
| Secondary load $R_s$ | 2,500 ohms. |
| Primary inductance L | 3.5 mh. |
| Secondary capacitative loading | 5–10 $\mu\mu$F. |

The primary source impedance $R_p$ was obtained by choosing a valve for V, having an anode impedance of 7,000 ohms, a suitable valve being one having a slope of 5 ma./v. at an anode current of 8 ma. and being capable of passing a current of 12 ma. at an anode potential of 150 v. without excessive dissipation and appreciable grid current.

The circuit shown in Fig. 6 having components as set out above has been found to give good results. The transformer gave an output pulse with a time of rise of less than .1 $\mu$ sec. with an overshoot of about 5% at the top of the pulse. The transformer was found to work equally well for negative inputs to the valve $V_1$ provided that the primary winding was shunted by a 10,000 ohm resistor to provide correct source impedance.

The circuit illustrated in Fig. 7 is similar to that shown in Fig. 6 but is modified by the substitution of an auto-transformer for the transformer of Fig. 6. This circuit operates in exactly the same way as that of Fig. 6, and similar references are used.

What I claim is:

1. An electrical circuit according to claim 4, wherein the resistive load comprises a resistor across which the output from the circuit is taken.

2. An electrical circuit according to claim 4 wherein the resistive load comprises a resistor across which the output from the circuit is taken and an external load applied to said output.

3. An electrical circuit according to claim 4 wherein the numerical value of the ratio of the impedance of the circuit driving the transformer to the value of the resistive load reflected at the input terminals of the transformer is of the order of ten.

4. An electrical circuit comprising a pulse transformer having input and output terminals and a ratio of secondary to primary turns denoted by *n*, an electrical input circuit connected across said input terminals to drive said transformer and having an impedance of predetermined magnitude, a resistive load having an impedance which is low compared with the product of the impedance of the input circuit and $n^2$, and a non-linear element connected in series with said resistive load across the output terminals of the transformer and arranged to pass an electric current into the resistive load on the appearance of an output pulse of the correct polarity at said output terminals.

5. An electrical circuit embodying a pulse transformer having input and output terminals and a ratio of secondary to primary turns denoted by *n*, comprising in combination an input circuit connected across said input terminals to drive said transformer and having an impedance of predetermined magnitude, a resistor having an electrical resistance the value of which is low compared with the product of the impedance of the input circuit and $n^2$, and a rectifying diode connected in series with said resistor across said output terminals to pass a current into said resistor on the appearance of an output pulse of the correct polarity at said output terminals, the output of said electrical circuit being taken across said resistor.

6. An electrical circuit embodying a pulse transformer having input and output terminals and a ratio of secondary to primary turns denoted by *n*, comprising in combination impedance means of predetermined magnitude connected across said input terminals to drive said transformer, a resistive load having an impedance the magnitude of which is one tenth of the product of the impedance of said impedance means and $n^2$, and a non-linear element connected in series with said resistive load across said output terminals to pass a current into said resistive load on the appearance of an output pulse of the correct polarity at said output terminals.

References Cited in the file of this patent

UNITED STATES PATENTS 2,413,932 Sziklai ---------------- Jan. 7, 1947